United States Patent
Gregerson et al.

(10) Patent No.: US 7,106,825 B2
(45) Date of Patent: Sep. 12, 2006

(54) APPARATUS AND METHOD FOR RECONSTRUCTION OF VOLUMETRIC IMAGES IN A DIVERGENT SCANNING COMPUTED TOMOGRAPHY SYSTEM

(75) Inventors: Eugene A. Gregerson, Bolton, MA (US); Richard K. Grant, Sudbury, MA (US); Norbert J. Johnson, North Andover, MA (US)

(73) Assignee: Breakaway Imaging, LLC, Littleton, MA (US)

( * ) Notice: Subject to any disclaimer, the term of this patent is extended or adjusted under 35 U.S.C. 154(b) by 90 days.

(21) Appl. No.: 10/645,323

(22) Filed: Aug. 21, 2003

(65) Prior Publication Data

US 2004/0179643 A1 Sep. 16, 2004

Related U.S. Application Data

(60) Provisional application No. 60/405,096, filed on Aug. 21, 2002.

(51) Int. Cl.
*A61B 6/03* (2006.01)

(52) U.S. Cl. .......................................... 378/19; 378/901
(58) Field of Classification Search ...................... 378/4, 378/8, 15, 19, 901
See application file for complete search history.

(56) References Cited

U.S. PATENT DOCUMENTS 3,549,885 A  12/1970  Andersson (Continued)

FOREIGN PATENT DOCUMENTS

| DE | 89 05 588.8 | 9/1990 |
|---|---|---|
| DE | 195 35 583 A1 | 3/1997 |
| DE | 198 39 825 C 1 | 10/1999 |
| DE | 199 27 953 A1 | 1/2001 |
| EP | 0 471 455 A2 | 7/1991 |
| EP | 0 564 292 A2 | 10/1993 |
| EP | 0 564 292 | 10/1993 |
| EP | 0 810 005 A2 | 12/1997 |
| EP | 1 090 585 A1 | 4/2001 |
| FR | 2 304 321 | 10/1976 |
| GB | 2 088 670 A | 6/1982 |
| WO | WO 96/06561 | 3/1996 |

OTHER PUBLICATIONS

Siremobil Iso–$C^{3D}$ Breathtaking Views in the OR!, Siemens, Siemens Aktiengesellschaft Medical Solutions Henkestrasse 127, D–91052 Erlangen, pp. 1–16, no date given.

Ning, R., et al., "An Image Intensifier–Based Volume Tomographic Angiography Imaging System", *SPIE* vol. 3032, pp. 238–247.

Chabbal, J., et al., "Amorphous Silicon X–Ray Image Sensor", *Physics of Medical Imaging*, Proceedings of SPIE, Feb. 23–25, 1997, vol. 3032.

(Continued)

*Primary Examiner*—David V Bruce
(74) *Attorney, Agent, or Firm*—Hamilton, Brook, Smith & Reynolds, P.C.

(57) ABSTRACT

An apparatus and method for reconstructing image data for a region are described. A radiation source and multiple one-dimensional linear or two-dimensional planar area detector arrays located on opposed sides of a region angled generally along a circle centered at the radiation source are used to generate scan data for the region from a plurality of diverging radiation beams, i.e., a fan beam or cone beam. Individual pixels on the discreet detector arrays from the scan data for the region are reprojected onto a new single virtual detector array along a continuous equiangular arc or cylinder or equilinear line or plane prior to filtering and backprojecting to reconstruct the image data.

27 Claims, 13 Drawing Sheets

U.S. PATENT DOCUMENTS

| | | | |
|---|---|---|---|
| 3,617,749 A | 11/1971 | Massiot | |
| 4,200,799 A | 4/1980 | Saito | |
| 4,352,986 A | 10/1982 | Pfeiler | |
| 4,442,489 A | 4/1984 | Wagner | |
| 4,481,656 A | 11/1984 | Janssen et al. | |
| 4,741,015 A | 4/1988 | Charrier | |
| 4,803,714 A | 2/1989 | Vlasbloem | |
| 4,810,881 A | 3/1989 | Berger et al. | |
| 4,829,252 A | 5/1989 | Kaufman | |
| 4,875,228 A | 10/1989 | Archer | |
| 4,884,293 A | 11/1989 | Koyama | |
| 4,935,949 A | 6/1990 | Fujita et al. | |
| 4,955,046 A | 9/1990 | Siczek et al. | |
| 4,982,415 A | 1/1991 | Shibata et al. | 378/15 |
| 4,987,585 A | 1/1991 | Kidd et al. | |
| 5,014,292 A | 5/1991 | Siczek et al. | |
| 5,014,293 A | 5/1991 | Boyd et al. | |
| 5,032,990 A | 7/1991 | Eberhard et al. | |
| D323,386 S | 1/1992 | Perusek | |
| 5,084,908 A | 1/1992 | Alberici et al. | |
| 5,095,501 A | 3/1992 | Kobayashi | |
| 5,097,497 A | 3/1992 | Deucher et al. | |
| 5,159,622 A | 10/1992 | Sakaniwa et al. | |
| 5,187,659 A | 2/1993 | Eberhard et al. | |
| 5,265,610 A | 11/1993 | Darrow et al. | |
| 5,287,274 A | 2/1994 | Saint Felix et al. | |
| D345,606 S | 3/1994 | Perusek | |
| 5,319,693 A | 6/1994 | Eberhard et al. | |
| 5,390,112 A | 2/1995 | Tam | |
| 5,448,607 A | 9/1995 | McKenna | |
| 5,448,608 A | 9/1995 | Swain et al. | |
| 5,452,337 A | 9/1995 | Endo et al. | |
| 5,499,415 A | 3/1996 | McKenna | |
| 5,515,416 A | 5/1996 | Siczek et al. | |
| 5,583,909 A | 12/1996 | Hanover | |
| 5,592,523 A | 1/1997 | Tuy et al. | |
| 5,598,453 A | 1/1997 | Baba et al. | 378/146 |
| 5,625,660 A | 4/1997 | Tuy | |
| 5,638,419 A | 6/1997 | Ingwersen | |
| 5,661,772 A | 8/1997 | Bär et al. | |
| 5,740,222 A | 4/1998 | Fujita et al. | |
| 5,740,224 A | 4/1998 | Muller et al. | |
| 5,745,545 A | 4/1998 | Hughes | |
| 5,784,428 A | 7/1998 | Schmidt | |
| 5,802,138 A | 9/1998 | Glasser et al. | |
| 5,912,943 A | 6/1999 | Deucher et al. | |
| RE36,415 E | 11/1999 | McKenna | |
| 6,041,097 A | 3/2000 | Roos et al. | |
| 6,147,352 A | 11/2000 | Ashburn | |
| 6,203,196 B1 | 3/2001 | Meyer et al. | |
| 6,212,251 B1 | 4/2001 | Tomura et al. | |
| 6,289,073 B1 | 9/2001 | Sasaki et al. | |
| 6,314,157 B1 | 11/2001 | Tachizaki | 378/4 |
| 6,322,251 B1 | 11/2001 | Ballhaus et al. | |
| 6,324,246 B1 | 11/2001 | Ruimi | |
| 6,325,537 B1 | 12/2001 | Watanabe | |
| 6,442,235 B1 | 8/2002 | Koppe et al. | |
| 6,484,049 B1 | 11/2002 | Seeley et al. | |
| 6,487,267 B1 | 11/2002 | Wolter | |
| 6,496,558 B1 | 12/2002 | Graumann | |
| 6,519,312 B1 | 2/2003 | Tybinkowski et al. | |
| 6,546,068 B1 | 4/2003 | Shimura | |
| 6,590,953 B1 | 7/2003 | Suzuki et al. | |
| 6,609,826 B1 | 8/2003 | Fujii et al. | |
| 2001/0005410 A1 | 6/2001 | Rasche et al. | |
| 2002/0118793 A1 | 8/2002 | Horbaschek | |
| 2002/0168053 A1 | 11/2002 | Schomberg | |
| 2003/0072416 A1 | 4/2003 | Rasche et al. | |

OTHER PUBLICATIONS

Hsiung, H., et al., "3D x–ray angiography: Study of factors affecting projection data consistency", *Physics of Medical Imaging*, Proceedings of SPIE, pp. 226–237, Feb. 23–25, 1997, vol. 3032.

Lwata, K., et al., "Description of a Prototype Combined CT–SPECT System with a Single CdZnTE Detector", *Nuclear Science Symposium Conference Record*, 2000 IEEE, XP010556613, pp. 16–1—16–5.

Lang, T.F., et al., "A Prototype Emission–Transmission Imaging System", *Proceedings of the Nuclear Science Symposium and Medical Imaging Conference*, 1991 IEEE, XP010058199, pp. 1902–1906.

Lang, Thomas, F., et al., "Description of a Prototype Emission—Transmission Computed Tomography Imaging System", *Journal of Nuclear Medicine, Society of Nuclear Medicine*, 1992, XP002901050, pp. 1881–1887.

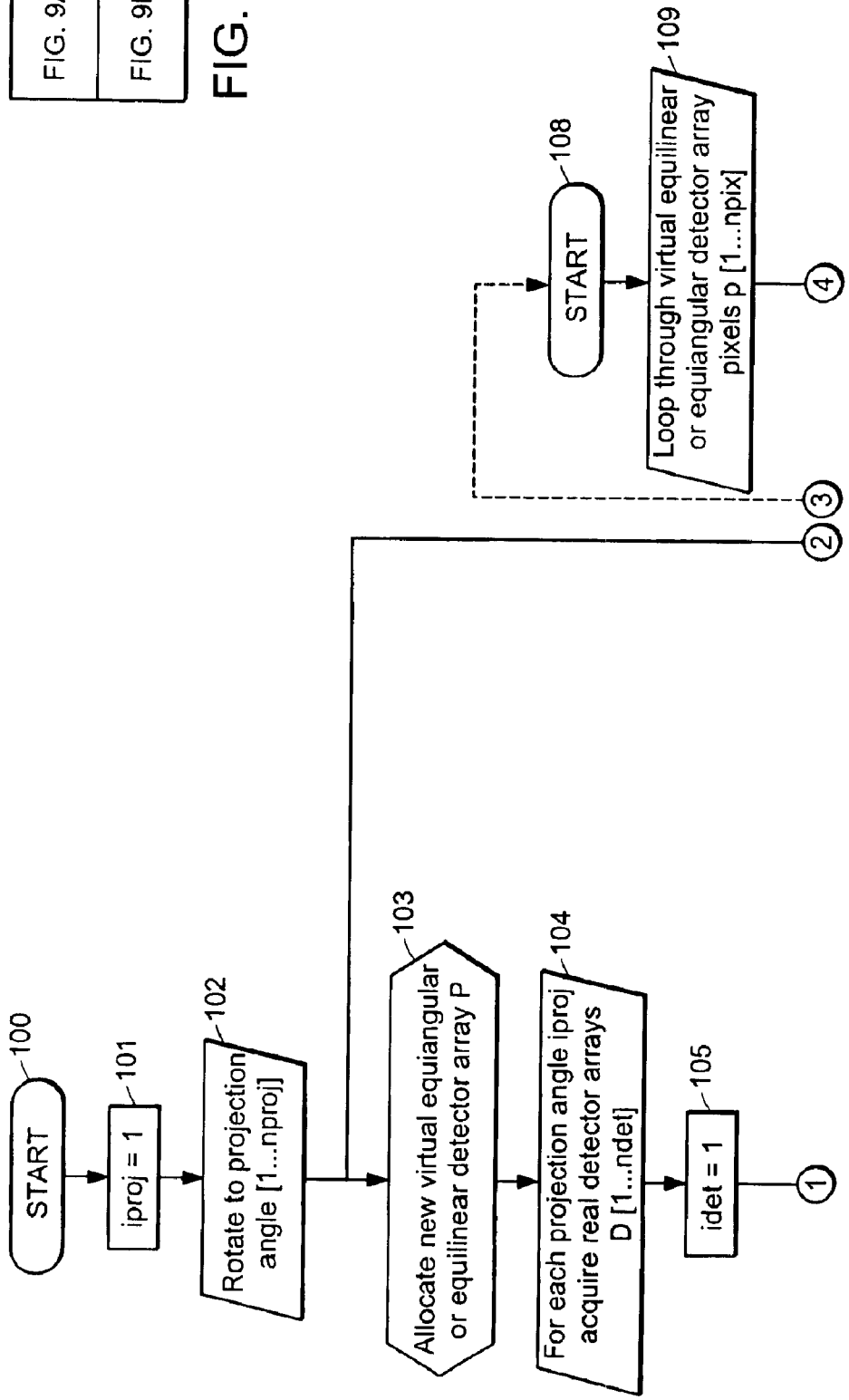

APPARATUS AND METHOD FOR RECONSTRUCTION OF VOLUMETRIC IMAGES IN A DIVERGENT SCANNING COMPUTED TOMOGRAPHY SYSTEM

RELATED APPLICATION

This application claims the benefit of U.S. Provisional Application No. 60/405,096, filed Aug. 21, 2002, the entire teachings of which are incorporated herein by reference.

BACKGROUND OF THE INVENTION

The present invention relates generally to 2D and 3D computerized tomography (CT). In particular this invention relates to methods and systems for reconstructing projection data which are neither equilinear or equiangular in nature.

In conventional computerized tomography for both medical and industrial applications, an x-ray fan beam and an equilinear or equiangular array detector are employed. Two-dimensional (2D) axial imaging is achieved. While the data set is complete and image quality is correspondingly high, only a single slice of an object is imaged at a time. When a 3D image is acquired, a "stack of slices" approach is employed. Acquiring a 3D data set one slice at a time is inherently slow. Moreover, in medical applications, motion artifacts occur because adjacent slices are not imaged simultaneously. Also, dose utilization is less than optimal, because the distance between slices is typically less than the x-ray collimator aperture, resulting in double exposure to many parts of the body.

In a system employing true cone-beam geometry, a cone-beam x-ray source and a flat 2D equilinear or curved 2D equiangular area detector are employed. An object is scanned, preferably over a 360-degree range, either by moving the x-ray source in a scanning circle around the object while keeping the 2D area detector fixed with reference to the source, or by rotating the object while the source and detector remain stationary. In either case, it is the relative movement between the source and object which affects scanning. Compared to the 2D "stack of slices" approach for 3D imaging, the cone-beam geometry has the potential to achieve rapid 3D imaging of both medical and industrial objects, with improved dose utilization.

The cone-beam geometry for 3D imaging has been discussed extensively in the literature, as represented by the following: M. Schlindwein, "Interactive Three-Dimensional Reconstruction from Twin Cone-Beam Projections", IEEE Trans Nucl. Sci., Vol. NS-25, No. 5, pp. 1135–1143 (October 1978); Gerald N. Minerbo, "Convolutional Reconstruction from Cone-Beam Projection Data", IEEE Trans. Nucl. Sci., Vol. NS-26, No. 2, pp. 2682–2684 (April 1979); Heang K. Tuy, "An Inversion Formula for Cone-Beam Reconstruction", SIAM J. Math, Vol. 43, No. 3, pp. 546–552 (June 1983); L. A. Feldkamp, L. C. Davis, and J. W. Kress, "Practical Cone-Beam Algorithm", J. Opt. Soc. Am. A., Vol. 1, No. 6, pp. 612–619, (June 1984); Bruce D. Smith, "Image Reconstruction from Cone-Beam Projections: Necessary and Sufficient Conditions and Reconstruction Methods", IEEE Trans. Med. Imag., Vol. MI-44, pp. 14–24 (March 1985); and Hui Hu, Robert A. Kruger, and Grant T. Gullberg, "Quantitative Cone-Beam Construction", SPIE Medical Imaging III: Image Processing, Vol. 1092, pp. 492–501 (1989).

Several methods for collecting cone beam data have been developed. One technique involves acquiring volumetric image data using a flat panel matrix image receptor, as described in U.S. Pat. No. 6,041,097 to Roos, et al. Another method uses image intensifier-based fluoroscopic cameras mounted on a CT-gantry type frame. Such a system is described in a paper presented at SPIE Medical Imaging Conference on Feb. 24, 1997, by R. Ning, X. Wang, and D. L. Conover of Univ. of Rochester Medical Center.

U.S. Pat. No. 5,319,693 to Eberhard, et al. discusses simulating a relatively large area detector using a relatively small area detector by either moving the actual area detector relative to the source, or moving the object relative to the detector.

However, there is a significant limitation of cone-beam reconstruction when individual flat detectors are reconstructed independently. Simply combining separate reconstructed portions of the object from independently processed projections results in an image characterized by discontinuous jumps between the various projections. Alternatively, one could first combine the discreet data sets from each detector into a new single data set that is then reconstructed. However, by simply combining the data into a larger data array and performing standard reconstruction techniques, the data elements in the new data set are not equally spaced. Thus, the resultant images will be distorted geometrically, or the dynamic range of the reconstructed data set will not represent the true transmission values of the object being imaged.

SUMMARY OF THE INVENTION

The deficiencies in existing methods for combining image data from multiple flat panel detector arrays result from the fact that these detector arrays have neither equilinear nor equiangular geometries. The present invention relates to improved systems and methods for reconstructing projection data, including x-ray projection data for two-dimensional (2D) fan-beam and three-dimensional (3D) cone beam CT imaging, in which the geometry of the detectors is neither equilinear or equiangular, by reprojecting the actual measured data into a new virtual data array, which has an equilinear or equiangular geometry. In one aspect, multiple discreet projection data sets, which, when combined, are neither equilinear or equiangular, are reprojected into a new virtual data set on an equilinear spaced detector on a line or plane, or an equiangular spaced detector array on an arc or cylinder. The resulting virtual projection data set can then be reconstructed using standard backprojection techniques and generate images which are geometrically correct, and represent the true x-ray transmission properties of the object being imaged.

In one embodiment, the projection data from two or more 1D linear or 2D flat detector arrays are reprojected onto a single equilinear or equiangular virtual detector array prior to filtering and backprojecting the projection data.

In another embodiment, the projection data from two or more discrete detector positions are reprojected onto a virtual detector array having an equilinear or equilangular configuration, and the reprojected data is reconstructed to provide an image.

The "virtual" detector array of the present invention is a data array comprising a plurality of pixels, having an equilinear or equiangular geometry, where the data values assigned to each pixel in the virtual array is based upon data from an actual detector or set of detectors having a non-equilinear and non-equiangular geometry.

The present invention advantageously allows for the 2D and 3D tomographic reconstruction of objects. This invention enables divergent x-ray 2D fan beam or 3D cone beam tomographic reconstruction using a discrete number of 1D linear or 2D flat detectors angled relative to one another by using a novel rebinning and reprojection technique onto virtual equilinear or equiangular detector arrays prior to performing standard filtered backprojection tomographic reconstruction techniques.

The present invention is particularly useful for medical imaging applications, as well as numerous industrial applications, such as testing and analysis of materials, inspection of containers, and imaging of large objects.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
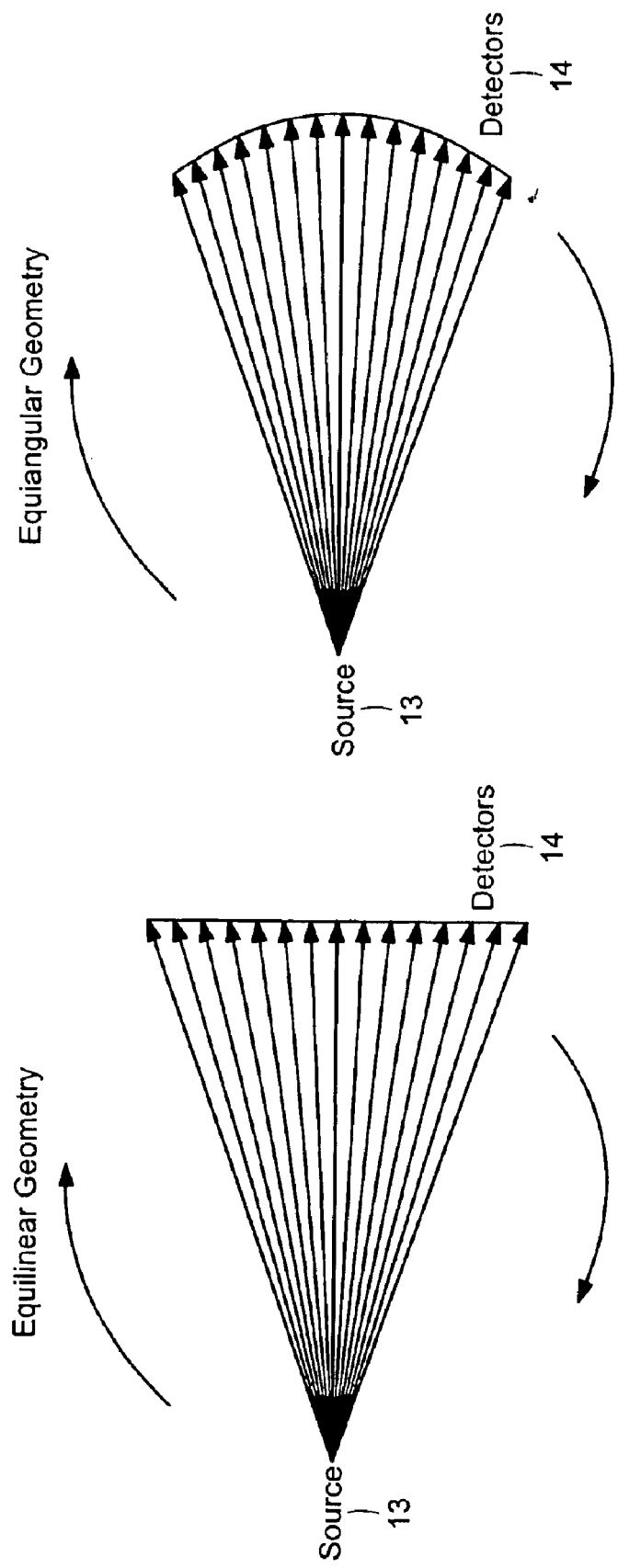
FIG. 1 shows standard equilinear and equiangular geometries used in various generations of CT scanners.

Referring to FIG. 1, equilinear and equiangular detector geometries are depicted. A radiation source 13 projects radiation onto multiple one-dimensional linear or two-dimensional planar area detector arrays 14 that are angled generally along line or a circle. The detector arrays generate scan data from a plurality of diverging radiation beams, i.e., a fan beam or cone beam. The source and detectors are rotated around the object to be imaged, and a plurality of projection images is captured to computer memory for tomographic projection image processing.

In the case of an equilinear geometry, a single source produces a fan or cone beam which is read by a linear 1D or 2D array of detectors, as shown on the left. In the case of an equiangular geometry, such as shown on the right, the detectors occupy a 1D arc to image fan beam data, or a 2D cylindriacal surface to image cone beam data.

Figure 2:
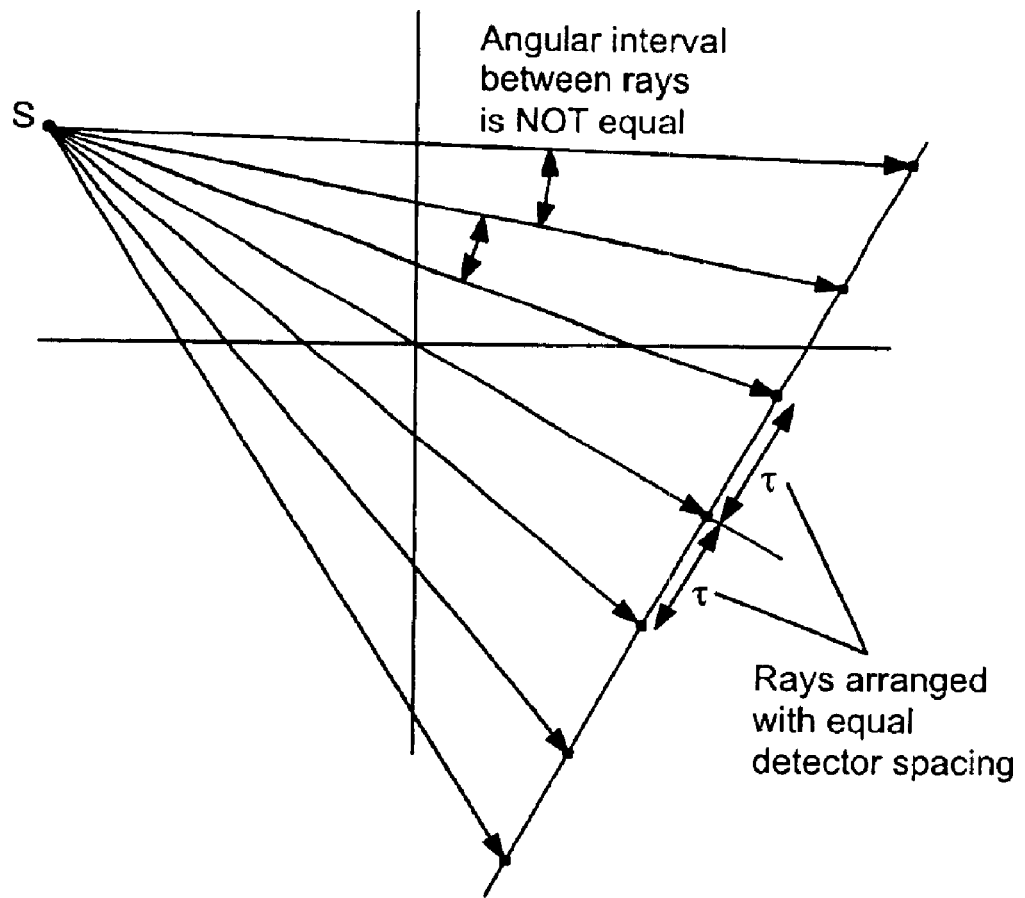
FIG. 2 shows a standard equilinear detector geometry in which the detectors are arranged with constant spacing along a line or plane.
Figure 3:
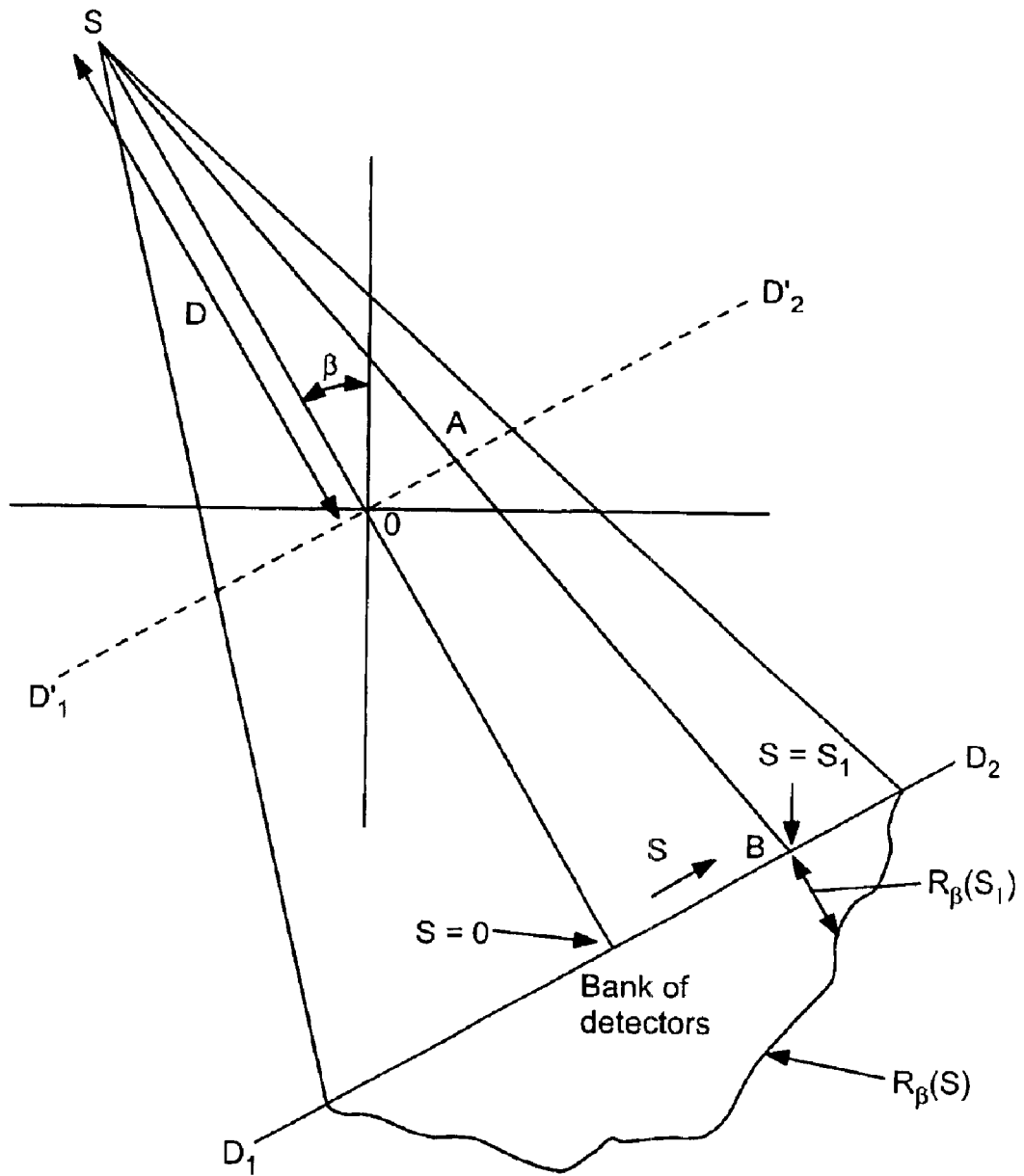
FIG. 3 shows the radiation profile of an imaged object defined by an equilinear arrangement of detectors.

Referring to FIGS. 2–3, an equilinear detector geometry is more clearly defined. As shown in FIG. 2, the detector elements in an array are arranged with constant spacing along a straight line or a flat plane. The angle between rays connecting the x-ray source point and the detector elements does not remain constant. A radiation absorption profile, or image, is generated with varying amplitudes for a region between the bank of detectors and the x-ray source, as shown in FIG. 3. Each ray is identified by its distance, s, from the projection of the central ray (s=0), and the absorption profile is denoted by the function $R_\beta(s)$.

Figure 4:
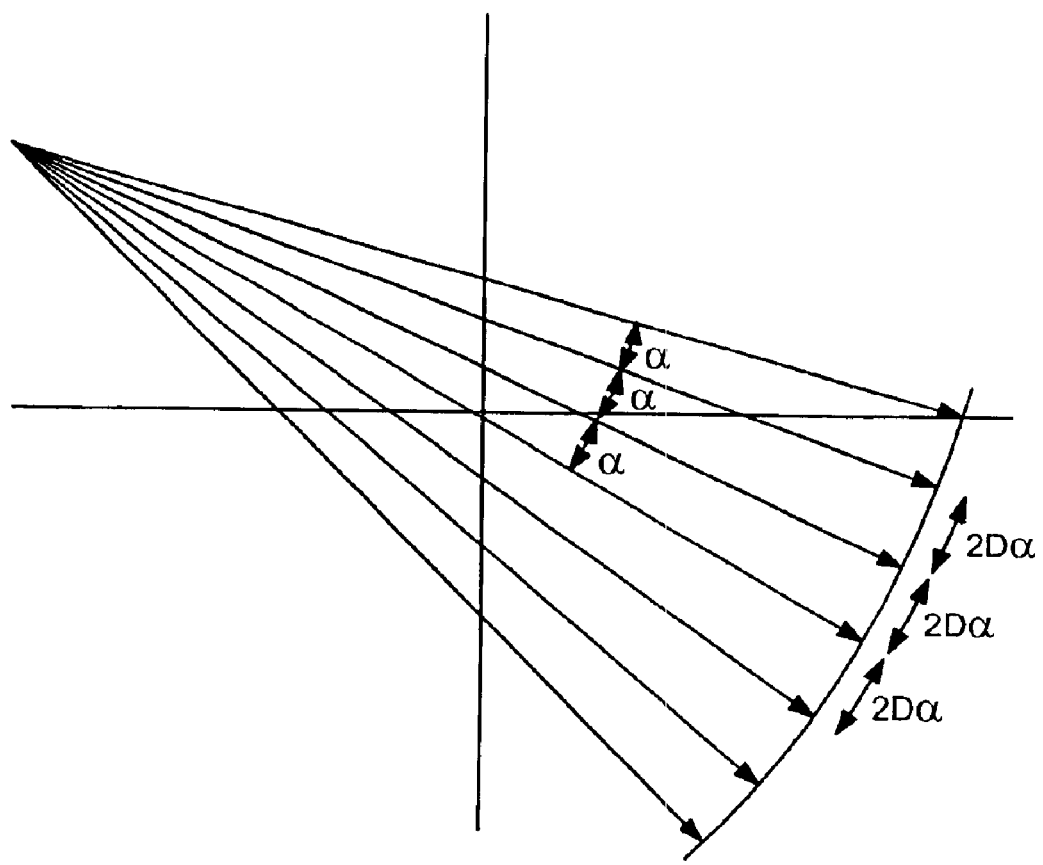
FIG. 4 shows a standard equiangular detector geometry in which the detectors are arranged with constant angular spacing along an arc or cylindrical surface.
Figure 5:
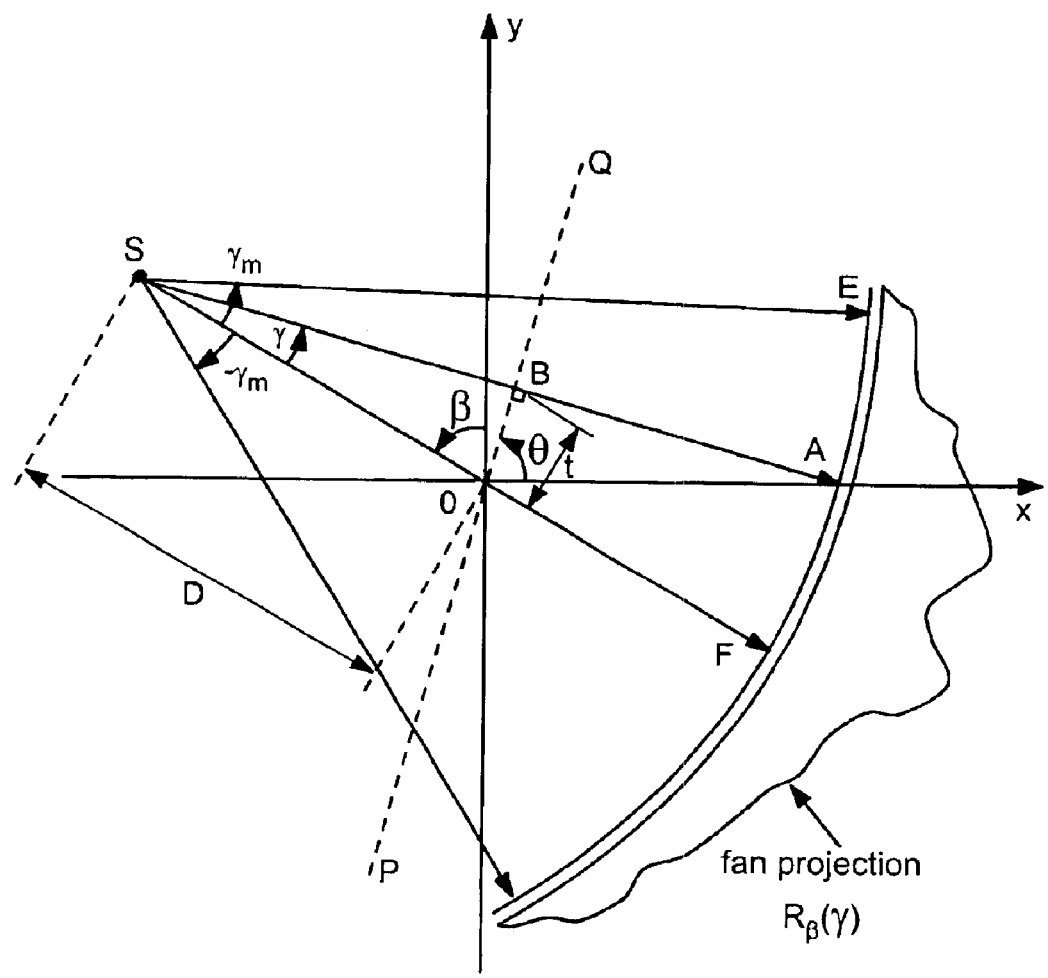
FIG. 5 shows the radiation profile of an imaged object defined by an equiangular arrangement of detectors.

FIGS. 4–5 illustrate an equiangular detector geometry. As illustrated in FIG. 4, the detector elements in an equiangular array are arranged with constant angular spacing along a circle or cylinder. In an equiangular geometry, in contrast to equilinear geometry, the angle between rays connecting the x-ray source point and the detector elements remains constant, but the distance between detectors may change. FIG. 5 shows the radiation absorption profile for the region between the bank of detectors and the x-ray source. Each ray is identified by its angle, γ, from the central ray, and the absorption profile is denoted by the function $R_\beta(\gamma)$.

Figure 6:
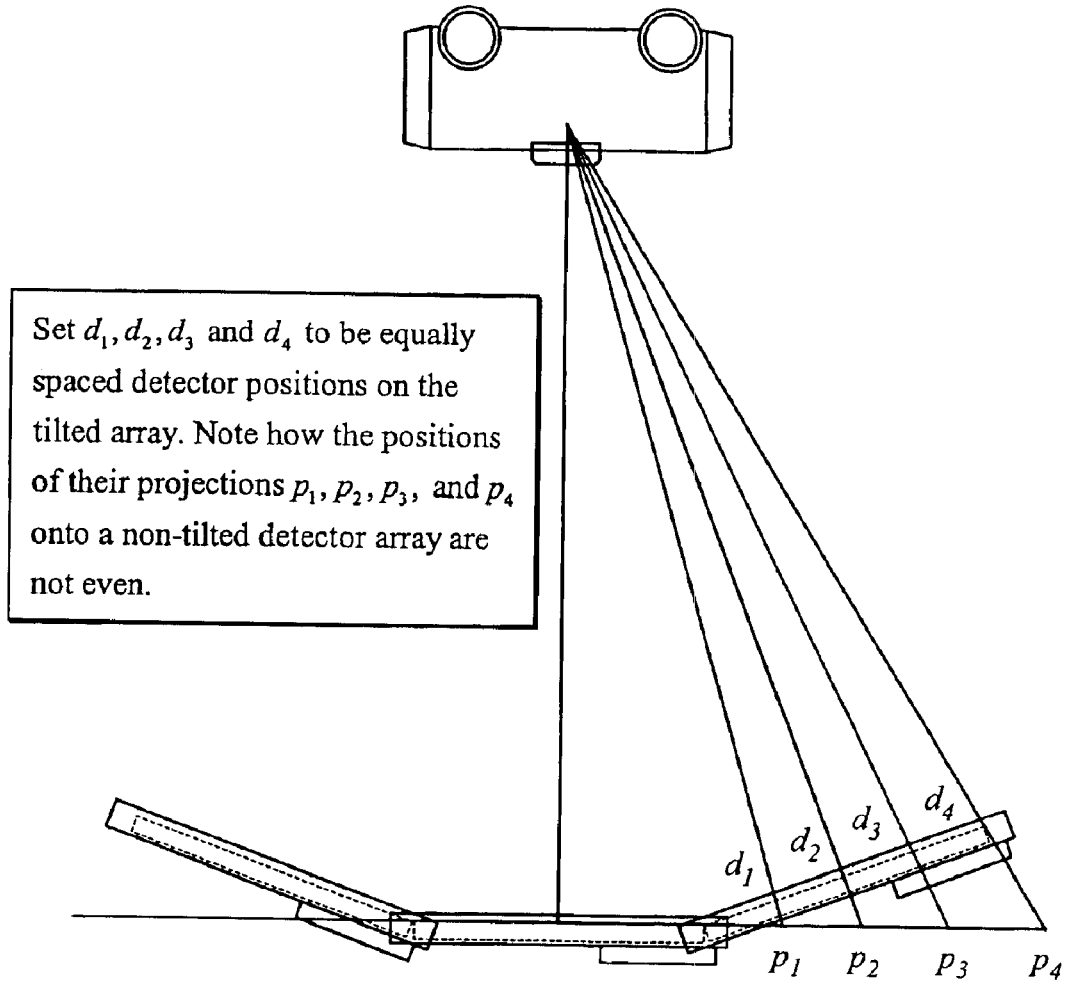
FIG. 6 shows three equilinear-spaced detector arrays positioned and angled relative to one another, resulting in a geometry that is neither equilinear nor equiangular.

In many radiation imaging applications, it is desirable to image objects that are wider than the field-of-view of the detector array. One method for achieving a wide field-of-view is to use multiple 1D or 2D detectors, arranged end-to-end and angled relative to one another, as shown in FIG. 6. Another technique is to use a single array, translated to discrete positions along an arc opposite the x-ray source, to obtain a large "effective" field of view. In either case, when one or more equilinear 1D linear fan beam or 2D planar cone beam detector arrays are positioned and angled along an arc opposite the x-ray source, the resulting geometry is neither equilinear or equiangular. As illustrated in FIG. 6, the projection of equally spaced detector elements, $d_j$, on the angled arrays do not project onto equally spaced detectors, $p_j$, located on lines, planes, or arcs. For example, assuming the detector elements on the tilted arrays are equally spaced, the process of reprojecting these elements onto a new virtual detector array which is coincident or parallel to the central detector array will result in projections that are not equidistant. Hence, assuming the Fourier transform filtering is performed continuously along the axes of the angled arrays without resampling, the spacing of detector arrays cannot be assumed to be equal.

Figure 7:
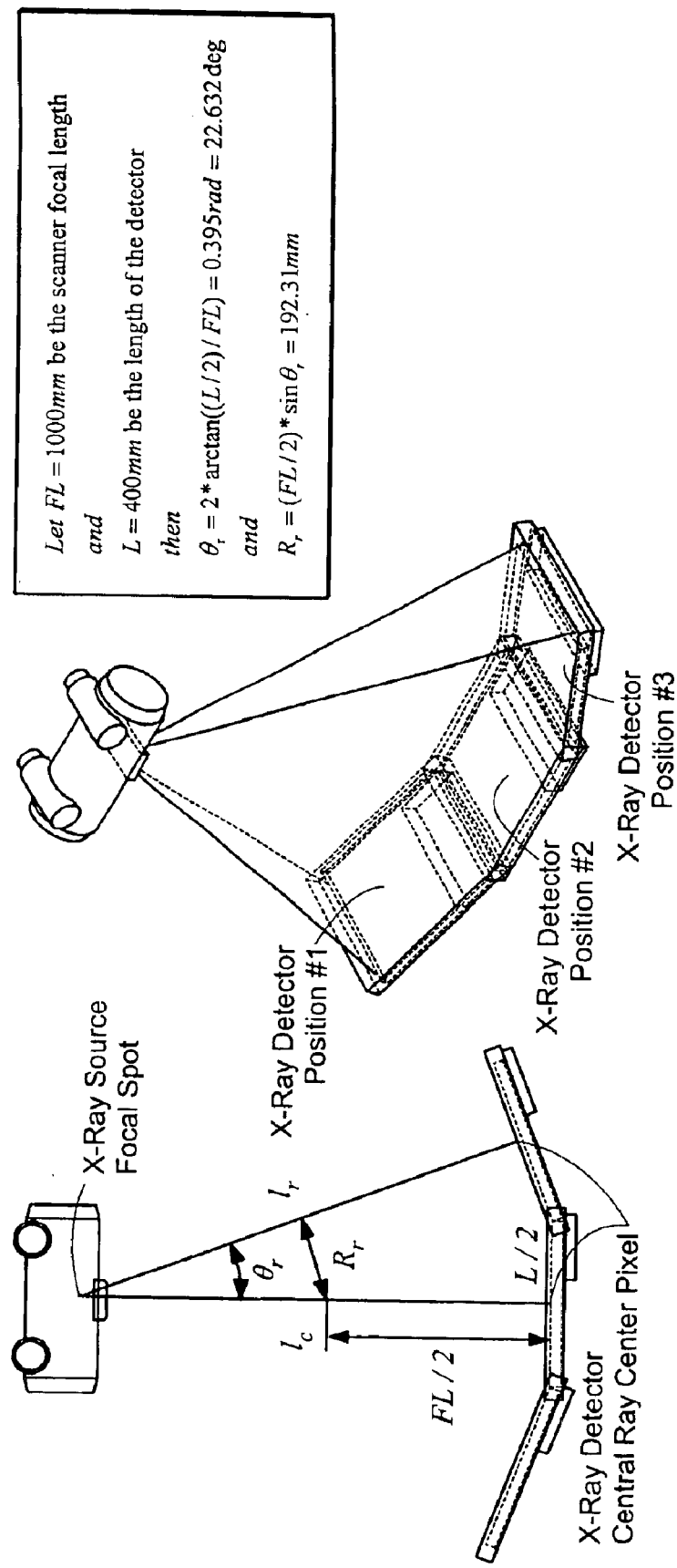
FIG. 7 shows the predicted radius of reconstructed object with three detector arrays generally positioned along an arc having a radius centered at the x-ray focal spot.

FIG. 7 shows in more detail the result of filtering on non-equally spaced detectors. The predicted radius of a reconstructed object, $R_r$, is calculated on an angled detector geometry, assuming filtering is performed without resampling onto an equilinear array. If we assume that the scanner focal length, FL, is 1000 mm, and the length of the detectors, L, is 400 mm, then $\theta_r=2*\arctan((L/2)/FL)=0.395$ rad= 22.632 deg., and $R_r=(FL/2)*\sin\theta_r=192.31$ mm.

Figure 8:
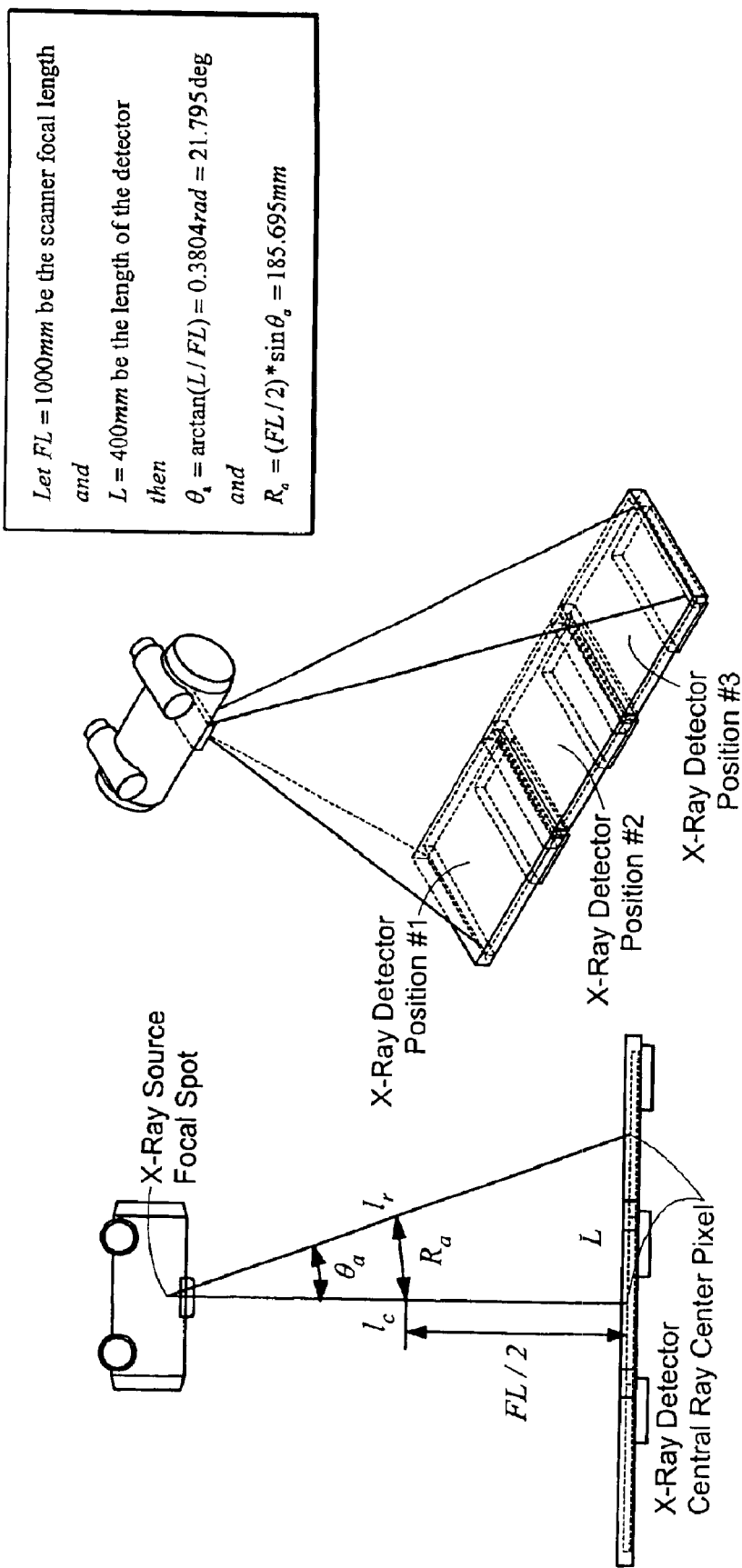
FIG. 8 shows the predicted radius of reconstructed object with three 1D linear or 2D flat plate detector arrays positioned along a straight line in an equilinear arrangement.

FIG. 8 illustrates this same calculation of the predicted radius of the reconstructed object assuming the same input parameters of focal length and detector length, but where the detector arrays are arranged in a plane to provide equilinear geometry. Here, $\theta_a$=arctan(L/FL)=0.3804 rad=21.795 deg., and $R_a$=(FL/2)*sin $\theta_a$=185.695 mm. The predicted radius of the angled detector geometry is larger than that of the equilinear detector geometry, and the resultant images with the angled detector geometry will be distorted geometrically.

Figure 9B:
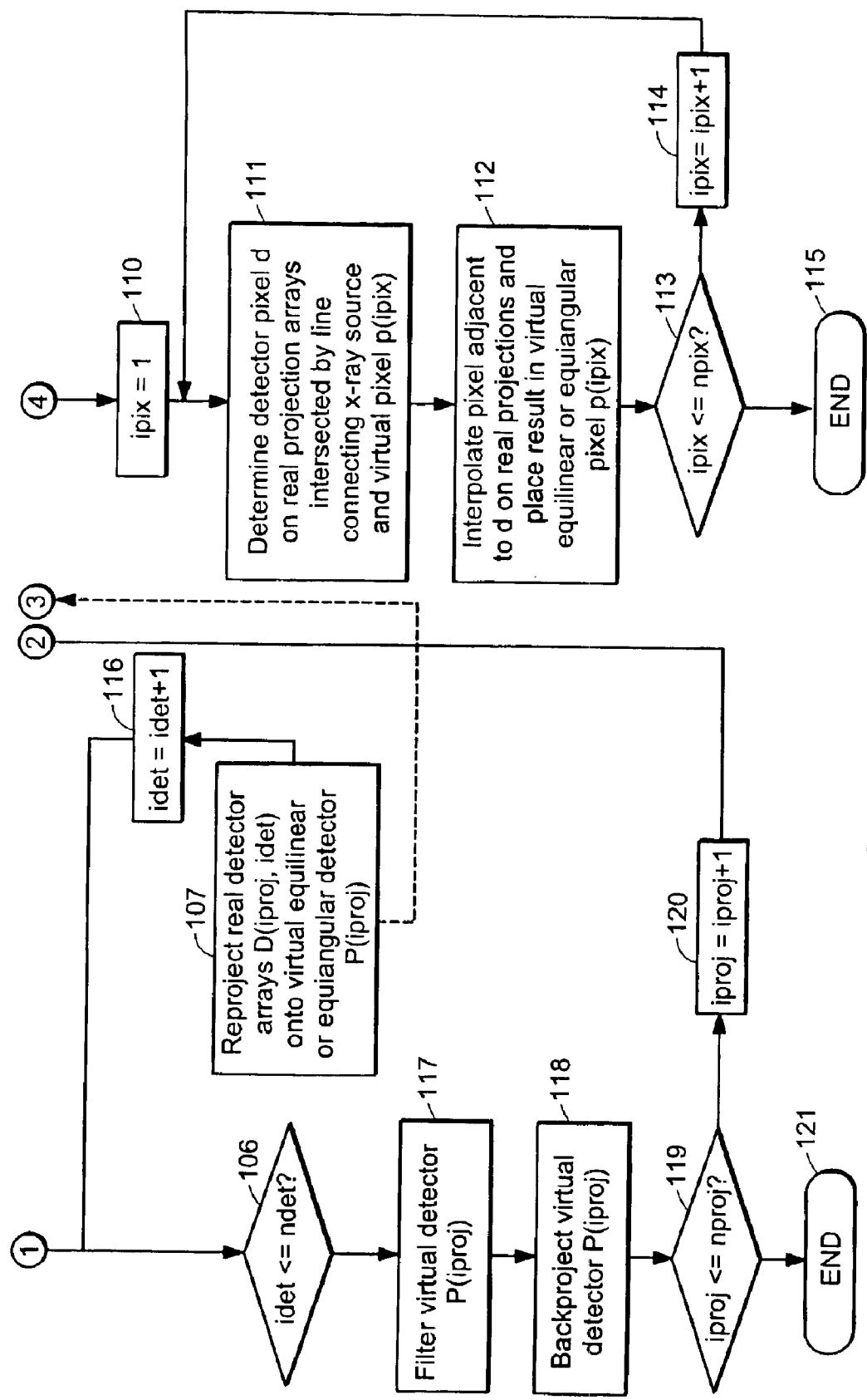
FIG. 9 is a flow chart diagram of the rebinning algorithm for reconstructing 1D fan beam or 2D cone beam projection data which is neither equilinear or equiangular.

This problem can be overcome by reprojecting and resampling the data from the angled detector arrays onto a "virtual" equilinear or equiangular array. The algorithm shown in FIG. 9 describes a method of reconstructing fan beam or cone beam x-ray projection data of an object, where the detector configuration is neither equilinear or equiangular. In particular, the algorithm describes a method for generating a new virtual equilinear or equiangular fan beam or cone beam detector array which is defined along a straight line or generally along an arc. For every pixel defined in the virtual detector array, the projection point in the original projection data is determined and the x-ray absorption amplitude for that point is calculated by interpolating the nearest neighbor pixels. Once resampling is completed, standard filtered backprojection and algebraic reconstruction techniques may be performed to generate image data. The method consists of creating a single virtual detector array for each projection position, which is defined as being equilinear or equiangular, and reprojecting two more real detector arrays onto the virtual array. Once the real projection data is reprojected onto the virtual detector, the data is filtered and backprojected using standard tomographic reconstruction techniques;

As shown in step 101 of FIG. 9, the projection angle index, iproj, is first assigned the value 1. At step 102, the x-ray source and detector array(s) are moved to a projection angle relative to the object being imaged. This can be accomplished by either moving the source and detector relative to a stationary object (preferably by moving the source and detector in a circle or arc around the object), or by keeping the source and detector stationary and rotating the object to the desired projection angle.

The projection data can obtained for a plurality of projection angles (1 . . . nproj), preferably at a plurality of equally spaced angles as the source/detector and object are rotated 360 degrees with respect to each other.

At step 103, a new virtual equilinear or equiangular array, P, is allocated. The virtual array, P, includes virtual pixels which are equally spaced in distance along a line or plane in the case of a virtual equilinear array, or equally spaced in angle along an arc or curved plane in the case of a virtual equiangular array.

At step 104, the real projection data, D, from each real detector array (1 . . . ndet) is acquired for the given projection angle, iproj.

For each real detector array, D, the real projection data is then reprojected onto the virtual array, P, at step 107.

As shown at steps 108–115, the reprojection subroutine includes looping through each virtual pixel in the virtual array, P, (step 109), and for each virtual pixel, determining the real detector pixel, d, that is intersected by the line connecting the virtual pixel and the x-ray source (step 111).

Once this actual pixel, d, is determined, an interpolation technique then is applied to d and its nearest neighbors on the real detector array to compute an x-ray absorption amplitude value to be assigned to the virtual pixel, p (step 112). This process is repeated until absorption amplitude values have been assigned to each of the virtual pixels in the virtual array.

Once each of the real detector arrays has been projected onto a virtual equilinear or equiangular array, data from the virtual detector array is then filtered at step 117 and backprojected at step 118. As the name implies, there are two steps to the filtered backprojection algorithm: the filtering step, which can be visualized as a simple weighting of each Fourier transformed projection in the frequency domain, and the backprojection step, which can be seen as the dual, or in a more strict mathematical sense, the adjoint, of projection. Instead of projecting density values to a projection value, a projection value is backprojected, or smeared out, over the image points along the ray. This entire process is then repeated for each of the projection angles.

Figure 10:
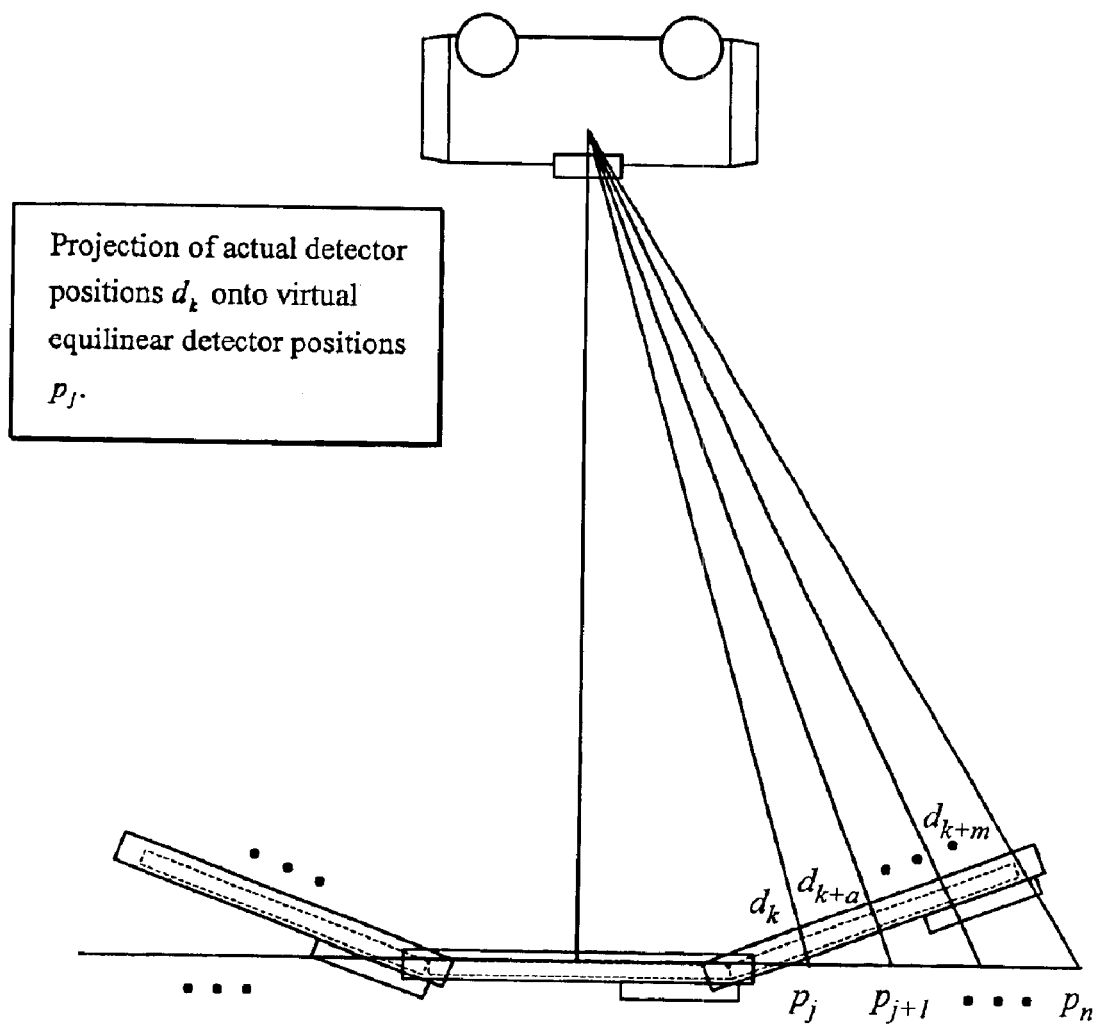
FIG. 10 shows the projection of multiple angled detector array positions onto a single virtual flat equilinear detector array.
Figure 11:
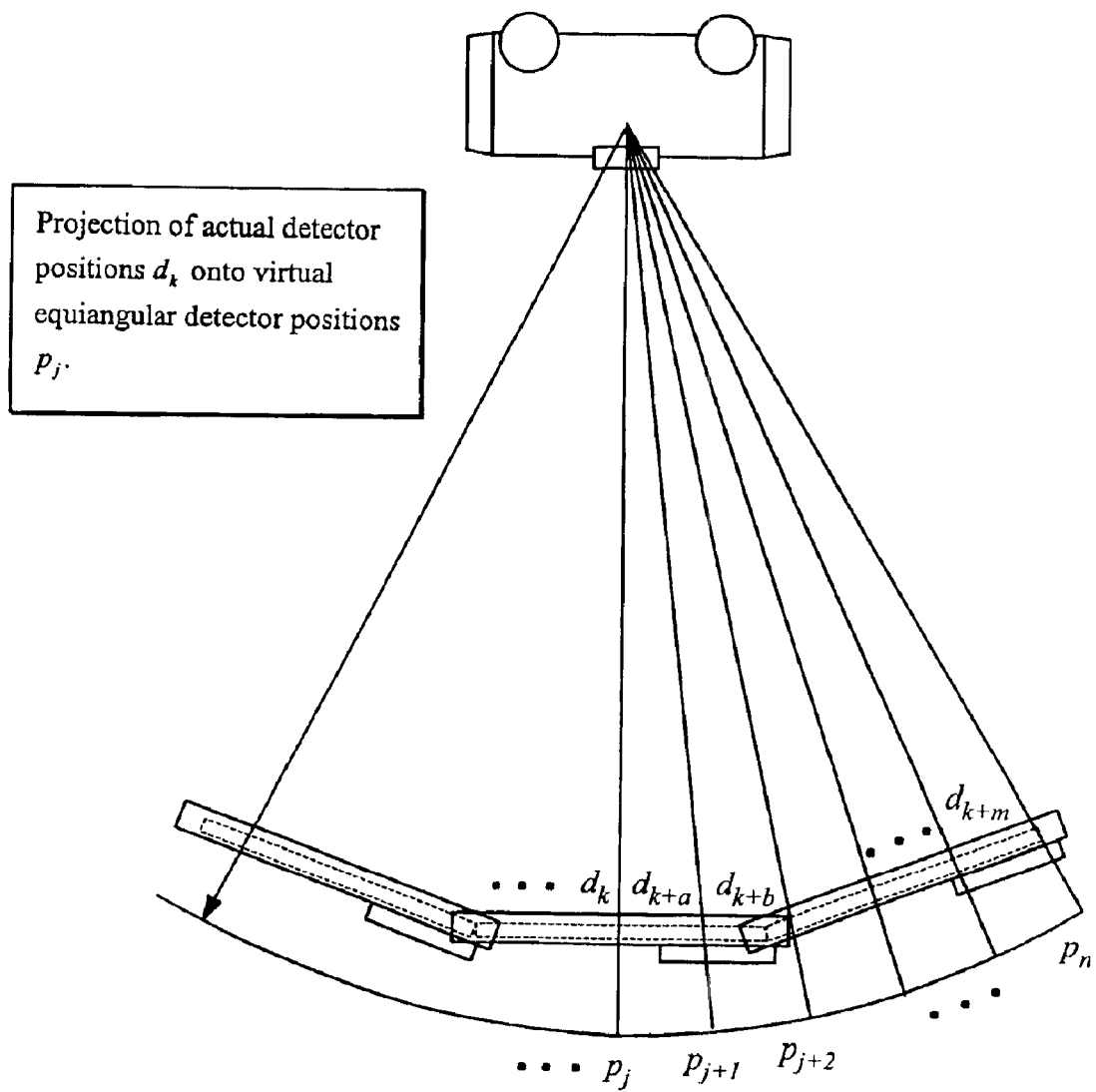
FIG. 11 shows the projection of multiple angled detector array positions onto a single virtual curved equiangular detector array.

Referring to FIGS. 10 and 11, the process of reprojecting x-rays onto virtual equilinear and equiangular detector arrays is schematically illustrated. In FIG. 10, once actual projection images are captured, a new equilinear virtual detector is allocated and defined along a one-dimensional line in the case that a fan beam geometry, or along a two-dimensional flat plane in the case of a cone beam geometry. In FIG. 11, the images are captured by the actual three-panel detector array, and then a new equiangular virtual detector is allocated. The equiangular virtual detector is an arc in the case of a fan beam geometry, and a curved cylindrical surface in the case of a cone beam geometry. In all of these embodiments, the new virtual array assumes that detector elements are equally spaced in distance or angle, respectively. For each detector element in the virtual array, the projected position in the real detector arrays is computed and an interpolation technique is applied to nearest neighbors on the real array to compute the correct x-ray absorption amplitude of the object to be reconstructed. Once the real detector arrays have been projected onto the virtual detector array, standard filtered backprojection, algebraic reconstruction techniques, and other tomographic imaging algorithms may be applied to generate image data of an object.

Figure 12:
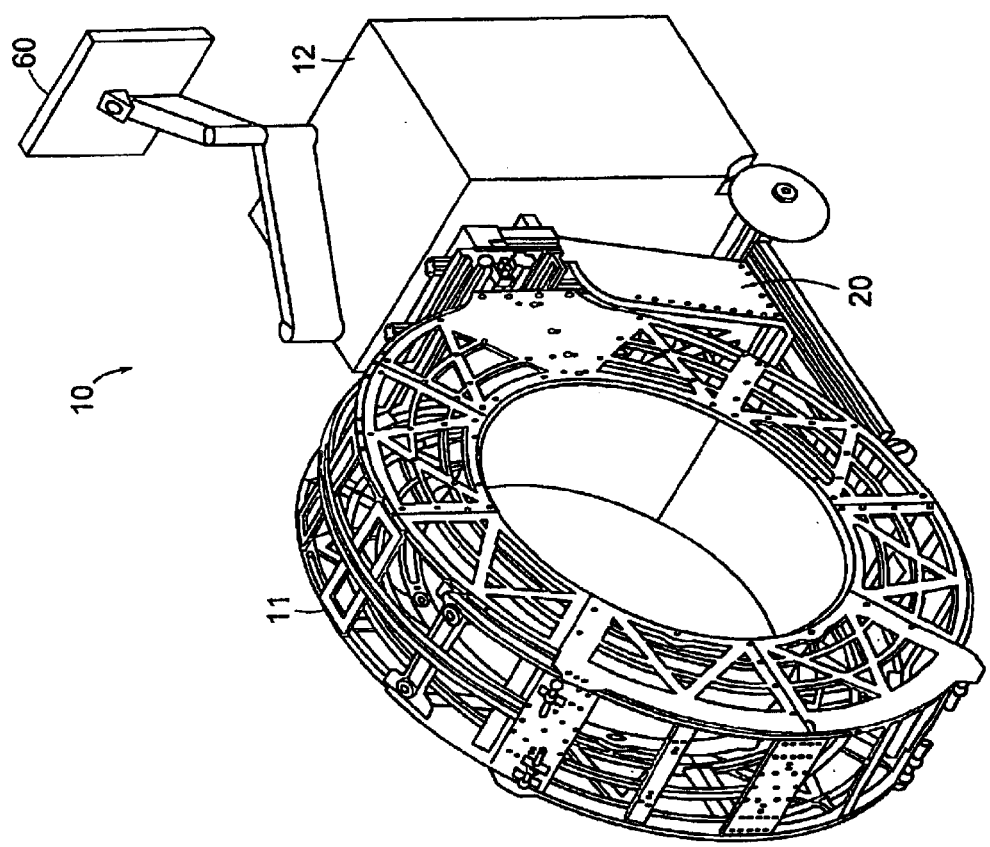
FIG. 12 is a schematic diagram of an x-ray scanning system having gantry positioning apparatus mounted to cantilvered O-shaped gantry and a mobile cart.
Figure 12:
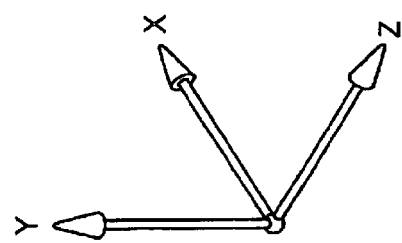

In the examples shown here, the real detector array comprises three flat panel detectors arranged end-to-end, and angled to approximate an arc having a radius centered on the focal spot of the radiation source. It will be understood, however, that the principles of the invention can be used with actual detectors having any number of detector elements, including both 1D line detectors and 2D panel detectors, where the geometry of the actual detector is neither equilinear or equiangular. In addition, the principles of the present invention can be advantageously employed in a system where one or more detectors are movable to various discrete positions along a line or arc relative to the x-ray source, such as described in co-pending U.S. patent application Ser. No. 10/392,365, filed on Mar. 18, 2003, the entire teachings of which are incorporated herein by reference. The principles of the present can also be used in a system in which the source and detector are tiltable about the focal spot of the source to obtain a larger field-of-view in the axial direction, such as described in co-pending U.S. application Ser. No. 10/645,322 entitled "Cantilevered Gantry Positioning Apparatus for X-Ray Imaging System", (U.S. Pat. application No. 10/645,322), filed on even date herewith, the entire teachings of which are incorporated herein by reference. FIG. 12 is a schematic diagram showing an x-ray scanning system 10 described in the U.S. Pat. application No. 10/645,322. The x-ray scanning system 10 includes a gantry 11 secured to a support structure, which could be a mobile or stationary cart, a patient table, a wall, a floor, or a ceiling. The x-ray scanning system 10 can be used to obtain two-dimensional planar or three-dimensional computerized tomographic (CT) x-ray images of an object, such as a patient. In the embodiment shown in FIG. 12, the gantry 11 is a generally circular, or "O-shaped," housing having a central opening into which an object being imaged is placed. It will be understood that various other gantry configurations, such as a "C-shaped" gantry, can also be employed. In one embodiment, the gantry 11 contains an x-ray source (such as a rotating anode pulsed x-ray source) that projects a beam of x-ray radiation into the central opening of the gantry, through the object being imaged, and onto a detector array (such as a flat panel digital detector array) located on the opposite side of the gantry. The x-rays recieved at the detector can be used to produce a two dimensional or three dimensional image of the object using well-known techniques. The X-ray source is able to rotate around the interior of the gantry 11 in a continuous or step-wise manner so that the x-ray beam can be projected through the object, and through a common isocenter, at various angles over partial or full 360 degree rotation. The detector array is also rotated around the interior of the gantry, in coordination with the rotation of the x-ray source, so that for each projection angle of the x-ray source, the detector array is positioned opposite the x-ray source on the gantry. The apparatus is thus able to obtain high-quality x-ray images of the targeted object in any projection plane over a partial or full 360 degree rotation.

While this invention has been particularly shown and described with references to preferred embodiments thereof, it will be understood by those skilled in the art that various changes in form and details may be made therein without departing from the scope of the invention encompassed by the appended claims.

Also, while the embodiments shown and described here relate in general to medical imaging, it will be understood that the invention may be used for numerous other applications, including industrial applications, such as testing and analysis of materials, inspection of containers, and imaging of large objects.

What is claimed is:

1. A method of imaging an object using radiation, comprising:
   from a source located at one side of a generally O-shaped gantry, projecting a beam of radiation into a central opening of the gantry, through an object being imaged, and onto at least one real detector array located on the opposite side of the gantry;
   obtaining projection data from the at least one real detector array, the at least one real detector array obtaining projection data at two or more positions, on the gantry and having a geometry that is neither equilinear nor equiangular;
   reprojecting the projection data onto a virtual detector array that has a geometry that is either equilinear or equiangular; and
   reconstructing the reprojected data from the virtual detector array.

2. The method of claim 1, wherein the at least one real detector array comprises two or more detectors configured to obtain projection data at two or more positions.

3. The method of claim 1, wherein the at least one real detector array comprises at least one detector that is movable to obtain projection data at two or more positions.

4. The method of claim 1, wherein the radiation comprises x-ray radiation.

5. The method of claim 1, wherein the virtual detector array is equilinear.

6. The method of claim 1, wherein the virtual detector array is equiangular.

7. The method of claim 1, wherein reprojecting the projection data onto a virtual array comprises:
   allocating a virtual array that comprises virtual pixels that are equally-spaced in distance or angle;
   for each virtual pixel, determining a corresponding real detector pixel in a real detector array that is intersected by a line connecting the virtual pixel to the source of projected radiation; and
   using a radiation amplitude value detected at the corresponding real detector pixel to determine a radiation amplitude value for the virtual pixel.

8. The method of claim 7, wherein determining a radiation amplitude value for the virtual pixel comprises interpolating a value from the radiation amplitude values of the corresponding real detector pixel and neighboring real detector pixels.

9. The method of claim 1, further comprising:
   filtering data from the virtual detector array; and
   backprojecting data from the virtual detector array.

10. The method of claim 1, wherein the at least one real detector array comprises at least one one-dimensional line detector.

11. The method of claim 1, wherein the at least one real detector array comprises at least one two-dimensional flat panel detector.

12. The method of claim 1, wherein the source and the at least one real detector array are rotated around the circumferance of the generally O-shaped gantry.

13. A system for imaging an object using radiation, comprising:
   a generally O-shaped gantry having a central opening into which an object being imaged placed;
   a source of radiation housed within the gantry;
   at least one real detector array that obtains projection data at two or more positions on the gantry, and has a geometry that is neither equilinear nor equiangular; and
   a data process for reprojecting the projection data onto a virtual detector array that has a geometry that is either equilinear or equiangular, and for reconstructing the reprojected data from the virtual detector array.

14. The system of claim 13, wherein the source comprises an x-ray source.

15. The system of claim 13, wherein the at least one real detector array comprises at least one one-dimensional line detector.

16. The system of claim 13, wherein the at least one real detector array comprises at least one two-dimensional flat panel detector.

17. The system of claim 13, wherein the virtual detector array is equilinear.

18. The system of claim 13, wherein the virtual detector array is equiangular.

19. The system of claim 13, wherein the at least one real detector array comprises at least two detectors configured to obtain projection data at two or more positions on the gantry.

20. The system of claim 19, wherein the at least two detectors are disposed end-to-end, and angled relative to one another to approximate an arc having a radius centered at a focal spot of the source.

21. The system of claim 13, wherein the at least one real detector array comprises at least one detector movable to two or more positions on the gantry to obtain projection data.

22. The system of claim 13, wherein the virtual detector array comprises an array of equally-spaced virtual pixels.

23. The system of claim 22, wherein the data process reprojects data by assigning a radiation amplitude value to each virtual pixel based upon a measured radiation amplitude value of a corresponding real pixel that intersects a line between the virtual pixel and the radiation source.

24. The system of claim 13, wherein the source and the at least one real detector array are rotatable around the circumference of the generally O-shaped gantry.

25. A system for imaging an object using radiation, comprising:

means for obtaining projection data from at least one real detector array, the at least one real detector array obtaining projection data at two or more positions, and having a geometry that is neither equilinear nor equiangular;

means for reprojecting the projection data onto a virtual detector array that has a geometry that is equiangular; and means for reconstructing the reprojected data from the virtual detector array.

26. A method of imaging an object using radiation, comprising:

obtaining projection data from at least one real detector array, the at least one detector array obtaining projection data at two or more positions, and having a geometry that is neither equilinear nor equiangular;

reprojector the projection data onto a virtual detector array having an ewuiangular geometry; and reconstructing the reprojected data from the virtual detector array.

27. The method of claim 26, wherein the radiation comprises x-ray radiation.

* * * * *

UNITED STATES PATENT AND TRADEMARK OFFICE
CERTIFICATE OF CORRECTION

| | | |
|---|---|---|
| PATENT NO. | : 7,106,825 B2 | Page 1 of 1 |
| APPLICATION NO. | : 10/645323 | |
| DATED | : September 12, 2006 | |
| INVENTOR(S) | : Eugene A. Gregerson, Richard K. Grant and Norbert J. Johnson | |

It is certified that error appears in the above-identified patent and that said Letters Patent is hereby corrected as shown below:

Column 7
Claim 1, line 48, delete "positions, on the gantry"
and insert -- positions on the gantry, --

Column 10
Claim 26, line 10, delete "ewuiangular" and insert -- equiangular --

Signed and Sealed this

Nineteenth Day of December, 2006

JON W. DUDAS
*Director of the United States Patent and Trademark Office*